United States Patent [19]

Cook

[11] Patent Number: 5,115,128

[45] Date of Patent: May 19, 1992

[54] SIGNAL EXTRACTION APPARATUS AND METHOD

[75] Inventor: Alan J. Cook, Birmingham, England

[73] Assignee: Lucas Industries Public Limited Companies, Birmingham, England

[21] Appl. No.: 456,787

[22] Filed: Dec. 29, 1989

[30] Foreign Application Priority Data

Jan. 6, 1989 [GB] United Kingdom ............... 8900304

[51] Int. Cl.$^5$ .............................................. H01J 5/16
[52] U.S. Cl. .......................... 250/227.21; 250/227.27
[58] Field of Search ........... 250/231.1, 231.19, 227.23, 250/225, 227.12, 227.27, 227.21

[56] References Cited

U.S. PATENT DOCUMENTS

| 4,451,730 | 5/1984 | Brogardh et al. | 250/227 |
| 4,562,348 | 12/1985 | Brogardh et al. | 250/231 R |
| 4,772,786 | 9/1988 | Langdon | 250/231 R |
| 4,933,545 | 6/1990 | Saaski et al. | 250/227.14 |

FOREIGN PATENT DOCUMENTS

| 0266974A2 | 5/1988 | European Pat. Off. . |
| 3203347A | 8/1982 | Fed. Rep. of Germany . |
| 2121953A | 1/1984 | United Kingdom . |

Primary Examiner—David C. Nelms
Assistant Examiner—T. Davenport
Attorney, Agent, or Firm—Nixon & Vanderhye

[57] ABSTRACT

A resonant beam sensor is excited into resonance by directing onto it a drive signal comprising light which has been amplitude modulated at the resonant frequency. A portion of the drive signal reflected by the sensor is demodulated by a photodetector to provide a measurement signal.

15 Claims, 5 Drawing Sheets

SIGNAL EXTRACTION APPARATUS AND METHOD

BACKGROUND OF THE INVENTION

1. Field of the Invention

The present invention relates to a signal extraction apparatus and method. Such an apparatus may be used to extract a measurement signal from a drive signal for a transducer.

2. Discussion of Prior Art

A known type of transducer is the so-called oscillating or resonant beam transducer which is forced into oscillation at its resonant frequency by the impingement of light which has been amplitude-modulated at the resonant frequency of the beam.

In order to provide a useful measurement signal, light of a particular optical wavelength is first amplitude modulated by drive elements at the resonant frequency of the beam and is then directed onto the beam. The resonant beam is thus caused to oscillate at its resonant frequency by the modulated "drive" light.

Another light source produces continuous or D.C. light of a different optical wavelength and this "detecting" light is directed towards the beam where it is amplitude modulated by movement of the beam. The reflected detecting light can be extracted from the reflected drive light by an optical wavelength filter because of the difference in optical wavelength. The extracted amplitude modulated detecting light is then directed onto a photodetector which provides an output representing the oscillating beam movement.

Although this arrangement works very well, it does require the presence of two light sources of different optical wavelengths which makes the arrangement somewhat expensive. Also, for convenience, a single optical fibre is used to transmit light from both sources to the oscillating beam and to return the reflected light to the photodetector. This requires the presence of two optical splitters, one being a beam splitter or Y-coupler and the other being a wavelength filter, which makes the arrangement expensive and cumbersome. The cost and complexity of this arrangement therefore precludes the use of transducer arrangements of this type in many applications which would otherwise be attractive.

SUMMARY OF THE INVENTION

According to a first aspect of the invention, there is provided a signal extraction apparatus, comprising means for generating a drive signal comprising a carrier signal amplitude modulated by a modulating signal, and coupling means for coupling the drive signal to a resonant sensor whose resonant frequency is substantially equal to the frequency of the modulating signal, characterised by a demodulator for demodulating a portion of the drive signal reflected by the sensor.

The carrier signal is preferably light and the index of modulation is preferably less than 100% so that the drive signal is an uninterrupted light signal.

It is thus possible to provide an extraction apparatus which allows the transducer signal to be extracted from the return signal, despite having the same frequency as the modulating signal. Such an arrangement may be used with a resonant or oscillating beam transducer as the resonant sensor with the generating means comprising a light source whose output never falls to zero.

Only a single light source is necessary and this allows the cost and complexity of the transducer arrangement to be reduced to a level where the arrangement finds much wider application than with previously known arrangements. The coupling means is preferably an optical fibre and the demodulator is preferably a photodetector coupled to the optical fibre to receive light reflected from the resonant device. A single beam splitter such as a Y-coupler is thus sufficient, and allows the cost and complexity of the transducer arrangement to be reduced as compared with previously known arrangements. In some applications, it may be desirable for a second photodetector to be coupled to the optical fibre so as to receive the modulated light and to supply the modulating signal to subtracting means. However, in general where substracting means is provided, it is preferred that the subtracting means receives the modulating signal direct, thus avoiding the cost and complexity of a second photodetector and a second beam splitter.

The signal extraction apparatus may, of course, be used with other forms of carrier signal, such as other parts of the electromagnetic spectrum or ultrasound.

According to a second aspect of the invention, there is provided a method of signal extraction, comprising directing onto a resonant sensor a drive signal comprising a carrier signal amplitude modulated by a modulating signal of frequency substantially equal to the resonant frequency of the sensor, and demodulating a portion of the drive signal reflected by the sensor.

BRIEF DISCUSSION OF THE DRAWINGS

The invention will be further described, by way of example, with reference to the accompanying drawings, in which.

DETAILED DISCUSSION OF PREFERRED EMBODIMENTS

Figure 1:
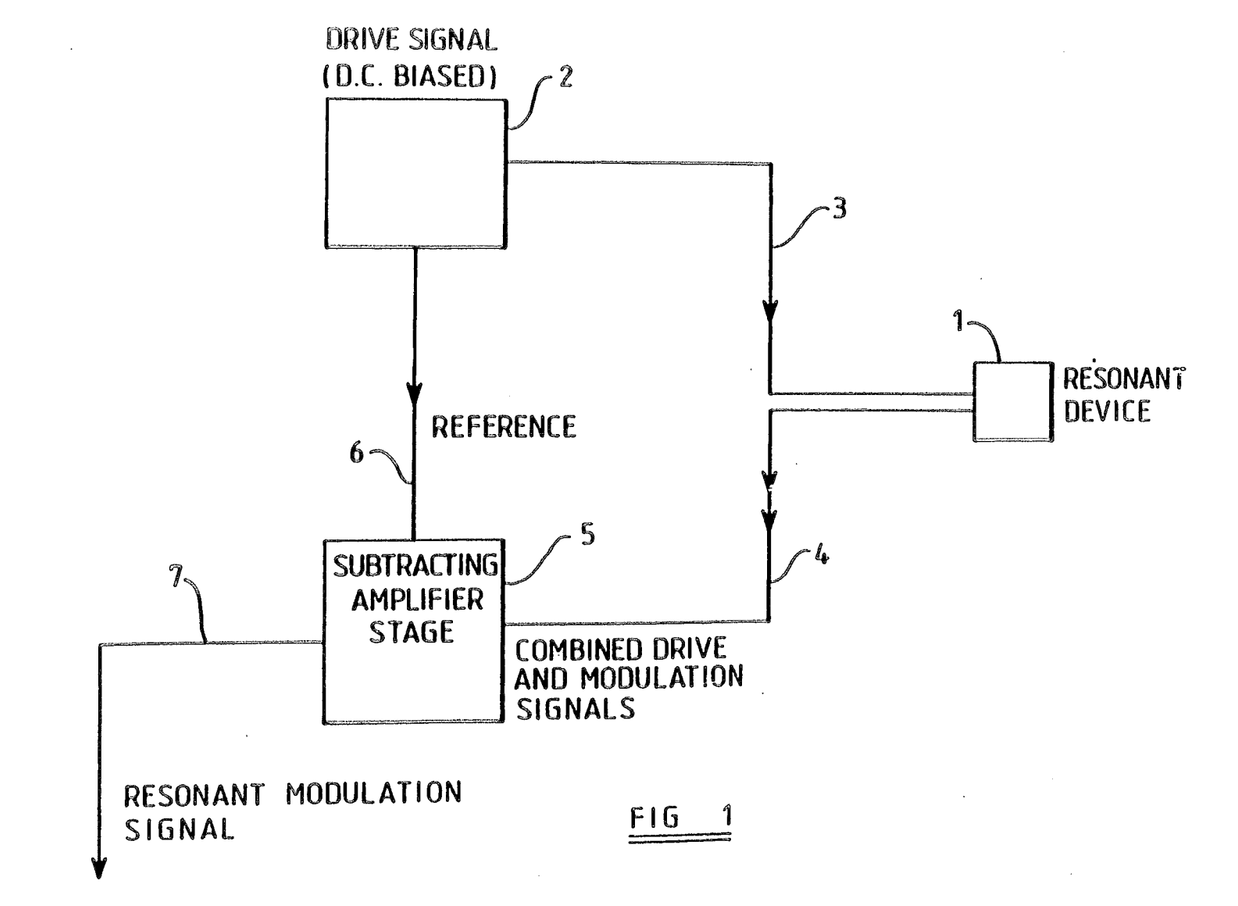
FIG. 1 is a schematic block diagram of a first general embodiment of the invention.

The signal extraction apparatus shown in FIG. 1 is coupled to a resonant device 1 which may be any device arranged to oscillate at a resonant frequency when supplied by a drive signal in the form of a carrier signal amplitude modulated by a modulating signal whose frequency is equal to the resonant frequency of the device 1. A drive signal generator 2 supplies a suitable drive signal via coupling means 3 to the resonant device 1. The drive signal supplied by the generator 2 comprises a carrier signal modulated by a modulating signal which itself comprises a repetitive signal DC biased such that the index of modulation is less than 100%. The amplitude of the modulated carrier signal therefore never falls to zero.

A return signal from the resonant device 1 is coupled by coupling means 4 to a first input of a subtracting amplifier stage 5, whose second input receives a reference signal from the generator 2 via coupling means 6. The return signal comprises a modulation signal carrying information provided by the resonant device 1 but contaminated by the drive signal.

The reference signal corresponds to the drive signal, and the subtracting amplifier stage 5 is arranged to subtract this from the contaminated signal so as to provide at an output 7 a clean version of the resonant modulation signal.

An analysis and description of operation will be given for a drive signal in the form of a modulated light signal. The modulated light signal has the form:

$$F(t) = A[Y + \mathrm{Sin}(wt)]$$

where A is the amplitude of the light carrier wave, w is the frequency in radians, and Y is a factor representing a D.C. bias signal which is applied to the modulation signal. Although a sinusoidal modulating signal is shown for the purpose of explanation, this is not essential and other functions of time could be used.

This waveform interacts with the resonant device such that the waveform F(t) is modulated by another function F'(t). The function F'(t) has the form:

$$F'(t) = [1 - B(1 + \mathrm{Sin}(wt + z))]$$

Where B is the amplitude and z is a phase term. This function describes the effect, on the light signal F(t), of the oscillatory movement of a resonant structure. As a result of the interaction, a waveform is produced which is the product of the two waveforms F(t) & F'(t), giving $$\begin{aligned}
F'(t) &= F(t) \cdot F(t) \\
&= A[Y + \mathrm{Sin}(wt)] \cdot [1 - B(1 + \mathrm{Sin}(wt + z))] \\
&= AY[1 - B(1 + \mathrm{Sin}(wt + z))] + \\
&\quad A \cdot \mathrm{Sin}(wt)[1 - B(1 + \mathrm{Sin}(wt + z))] \\
&= AY(1 - B) + A(1 - B)\mathrm{Sin}(wt) - \\
&\quad ABY \cdot \mathrm{Sin}(wt + z) + AB \cdot \mathrm{Sin}(wt) \cdot \mathrm{Sin}(wt + z)
\end{aligned}$$

The last term can be expanded resulting in, $$F'(t) = AY(1 - B) + A(1 - B)\mathrm{Sin}(wt) - ABY \cdot \mathrm{Sin}(wt + z) + \frac{AB}{2}\mathrm{Cos}(z) - \frac{AB}{2}\mathrm{Cos}(2wt + z)$$

By simple filtering it is possible to remove all terms except those in w, to give:

$$F'(t) = A(1 - B)\mathrm{Sin}(wt) - ABY \cdot \mathrm{Sin}(wt + z)$$

Finally, subtracting a reference signal $A(1-B)\mathrm{Sin}(wt)$ corresponding to the time-varying part of the modulation signal gives the resonant device modulation signal, $$\begin{aligned}
F'(t) &= F(t) \\
&= -ABY \cdot \mathrm{Sin}(wt + z)
\end{aligned}$$

The modulation signal F(t) is D.C. biased in order for the successful retrieval of the resonant device signal. The demodulation technique may thus be thought of as using amplitude modulation of a D.C. carrier. In the case of the light signal F(t) which is modulated, the D.C. biasing is arranged such that the driving signal F(t) is always on. Thus the driver may be switched between higher and lower states of light intensity but is not actually switched off.

Figure 2:
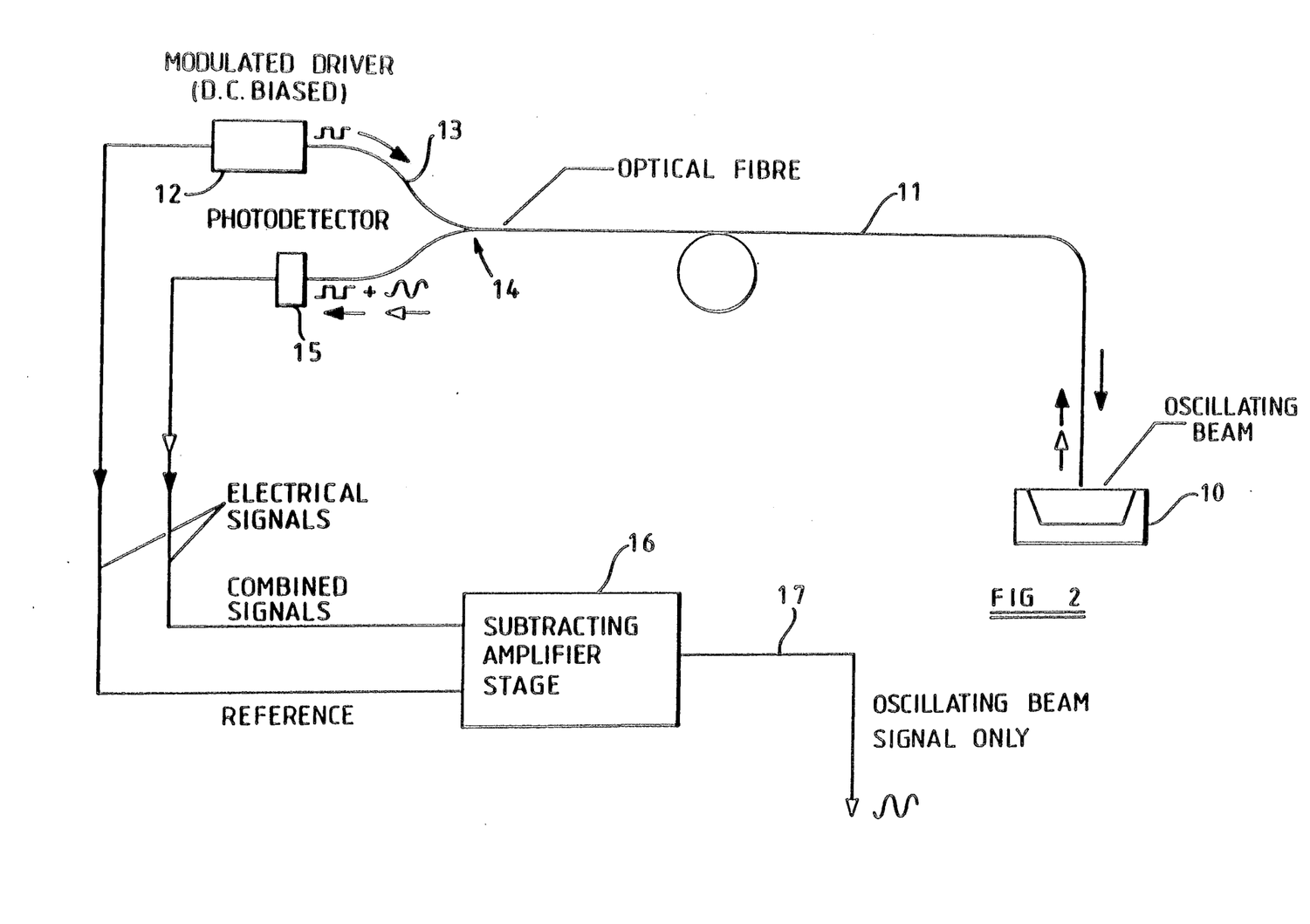
FIG. 2 is a schematic block diagram of a first preferred embodiment of the invention.

The signal extraction apparatus shown in FIG. 2 is connected to a resonant or oscillating beam transducer 10 by means of an optical fibre 11. A modulated driver 12 injects amplitude-modulated light into an optical fibre 13 connected to a first branch of a beam splitter/combiner 14, whose second branch is connected to a photodetector 15. The output of the photodetector 15 is connected to a first input of a subtracting amplifier stage 16, whose second input receives a modulating signal from the driver 12.

In use, the driver 12 generates light which is amplitude modulated at a frequency equal to the resonant frequency of the beam transducer 10. The driver ensures that the index of modulation is always less than 100%. Thus, prior to modulating the light, the modulating signal may be offset or applied with a DC bias so as to ensure that the light output by the driver never falls to zero. Light from the driver 12 passes via the optical fibre 13, the splitter/combiner 14, and the optical fibre 11 and impinges on the beam transducer 10. The transducer 10 reflects light into the optical fibre 11 and this is supplied via the splitter/combiner 14 to the photodetector 15 where the varying light is amplitude-demodulated to provide an output signal representing the amplitude of the reflected light signal. The light reflected by the beam transducer 10 into the optical fibre 11 has a first component which corresponds to the reflected drive signal i.e. the modulated light from the driver 12, and a second component whose amplitude varies in accordance with the measurement signal of the transducer 10 but which has a frequency equal to the resonant frequency of the beam transducer. The subtracting amplifier stage 16 is arranged to amplify the signals at its inputs to such an extent that the amplitude of the reference signal provided by the modulating signal from the driver 12 is equal to the component of the modulating signal which contaminates the measurement signal from the transducer. Subtraction performed by the stage 16 thus removes the contaminating modulating signal so that the output 17 of the stage 16 provides a signal representing the parameter measured by the oscillating beam transducer 10. The signal extraction apparatus therefore extracts a desired signal from a combination of the desired signal and a contaminant signal of the same frequency.

Figure 3:
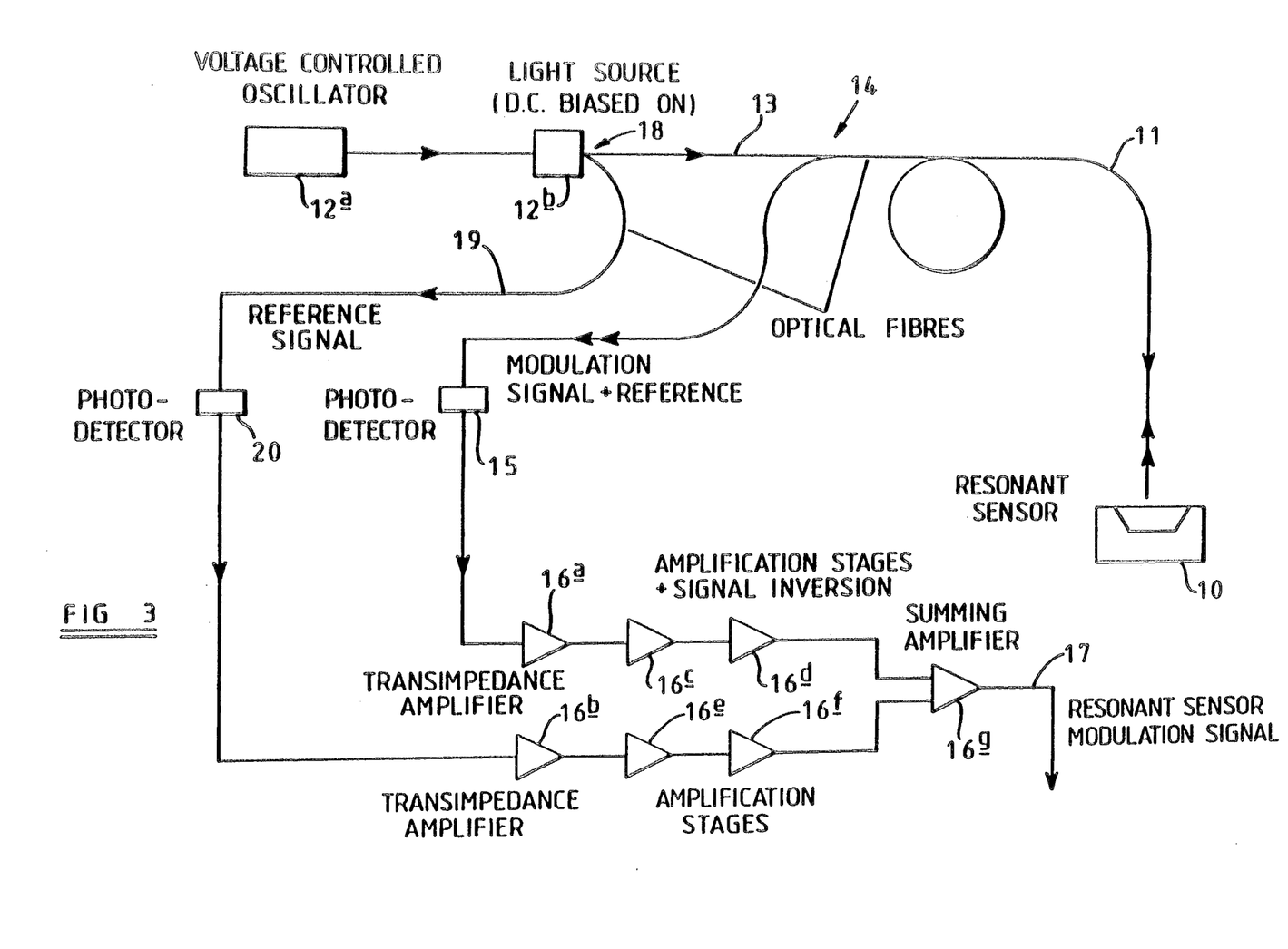
FIG. 3 is a more detailed block diagram of a second preferred embodiment of the invention.

The signal extraction apparatus shown in FIG. 3 is similar to that shown in FIG. 2, and corresponding parts are referred to by the same reference numbers. The driver is shown as comprising a voltage controlled oscillator 12a supplying the modulating signal to a light source 12b which is DC biased so as to remain on all the time. The stage 16 is also shown in more detail and comprises input stages 16a and 16b which perform an impedance buffering function, having relatively high input impedances. The output of the buffer 16a is connected to the input of an amplifier stage 16c whose output is connected to a signal inverting stage 16d. The output of the buffer amplifier 16b is connected to cascade-connected amplifier stages 16e and 16f. The outputs of the stages 16d and 16f are connected to the inputs of a summing amplifier 16g.

The main difference between the apparatus of FIG. 3 and the apparatus of FIG. 2 is that the reference signal is not supplied direct, e.g. from the voltage controlled oscillator 12a, but instead is derived from the output of the light source 12b. A beam splitter 18 divides the output of the light source between the optical fibre 13 and an optical fibre 19 connected to a further photodetector 20, whose output is connected to the input of the buffer amplifier 16b. Otherwise, the operation of the apparatus shown in FIG. 3 is the same as that shown in FIG. 2.

The apparatus of FIG. 3 requires the presence of an additional beam splitter 18 and an additional photodetector 20 compared with the apparatus of FIG. 2, and is therefore more complex and expensive. However, an advantage of the arrangement shown in FIG. 3 is that the reference signal passes through the same process steps as the return signal from the transducer 10 ie it is derived from the output of the light source 12b and is subjected to photodetection in the photodetector 20. This arrangement therefore compensates for any non-linearities in the light source 12b and, provided the photodetectors 15 and 20 are substantially identical, for any non-linearities in the action of the photodetector 15. The contaminating signal can therefore be removed or suppressed more completely from the combined signal to leave a purer resonant sensor modulation signal.

Although the apparatus of FIG. 3 is capable, under certain circumstances, of supplying a purer output signal, the apparatus of FIG. 2 has the advantage of being simpler and cheaper to manufacture, and therefore enjoys a wider range of application. For instance, the apparatus of FIG. 2 can be made sufficiently cheaply for use in automotive applications within vehicles.

Various modifications may be made within the scope of the invention. For instance, suitable means may be provided to compensate for time delays in the signals supplied to the subtracting stage. Also, any anomalies in the signal shape may be removed, for instance by bandpass filtering.

Figure 4:
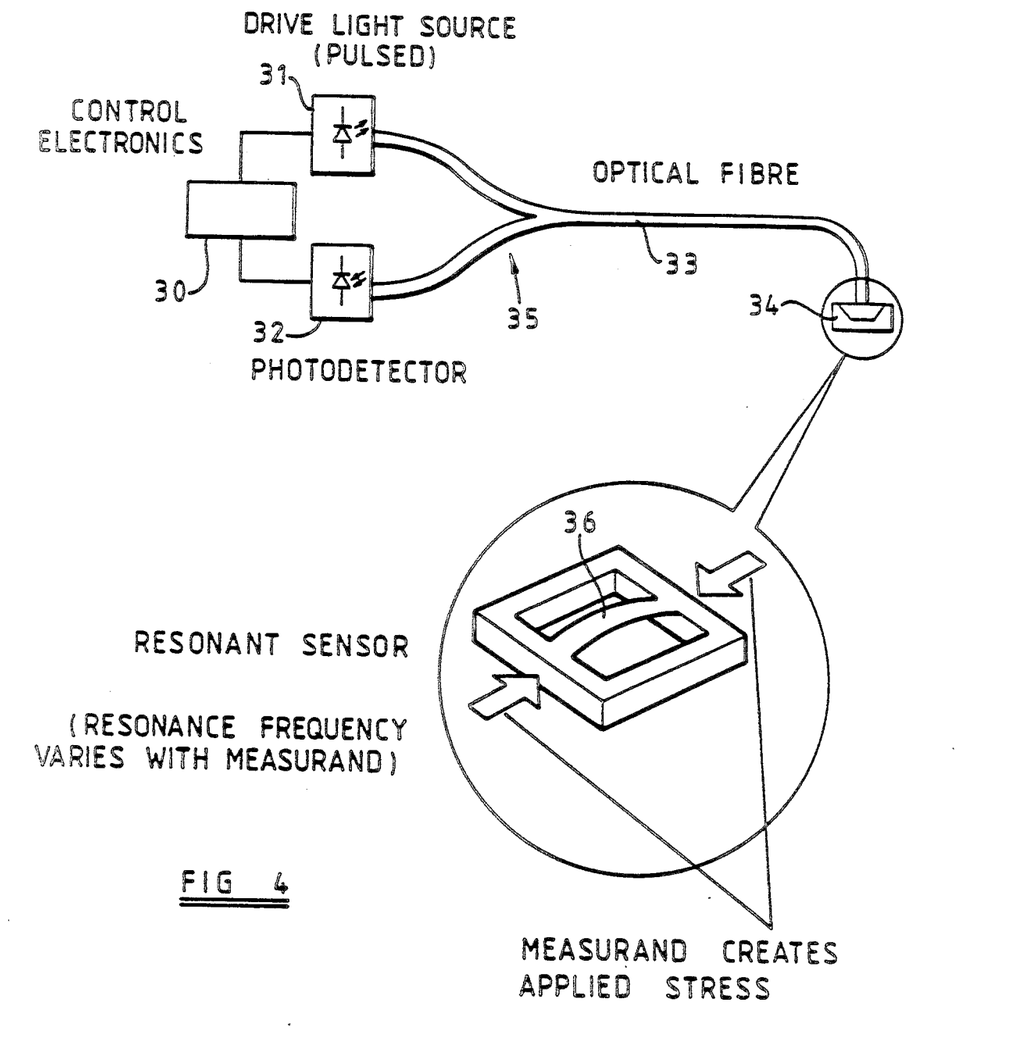
FIG. 4 illustrates a type of resonant beam transducer with which signal extraction apparatus may be used.

By way of example, FIG. 4 illustrates in more detail a resonant sensor connected to an apparatus constituting an embodiment of the invention and comprising control electronics 30, a drive light source 31, a photodetector 32, and an optical fibre 33 connected between a sensor 34 and a Y coupler 35. The resonant sensor comprises a bridge structure or beam 36 which is suspended at its ends and which is coated with a light absorbing material for enhancing the conversion of light energy to heat at a top surface of the bridge 36. The differential thermal expansion between the top and bottom surfaces of the bridge induces a bending movement which causes the bridge to flex upwardly. By amplitude-modulating the drive light at the resonant frequency of the structure, the beam 36 oscillates mechanically at its resonant frequency. By applying stress to the structure, the resonant frequency is altered and provides a measure of the applied stress.

The structure illustrated in FIG. 4 is relatively small. For instance, the bridge 36 may be of the order of 200 micrometers long, 10 micrometers wide, and 2w micrometers thick. The bridge 36 is thus compatible with single-mode and multi-mode optical fibres as the fibre 33.

Figure 5:
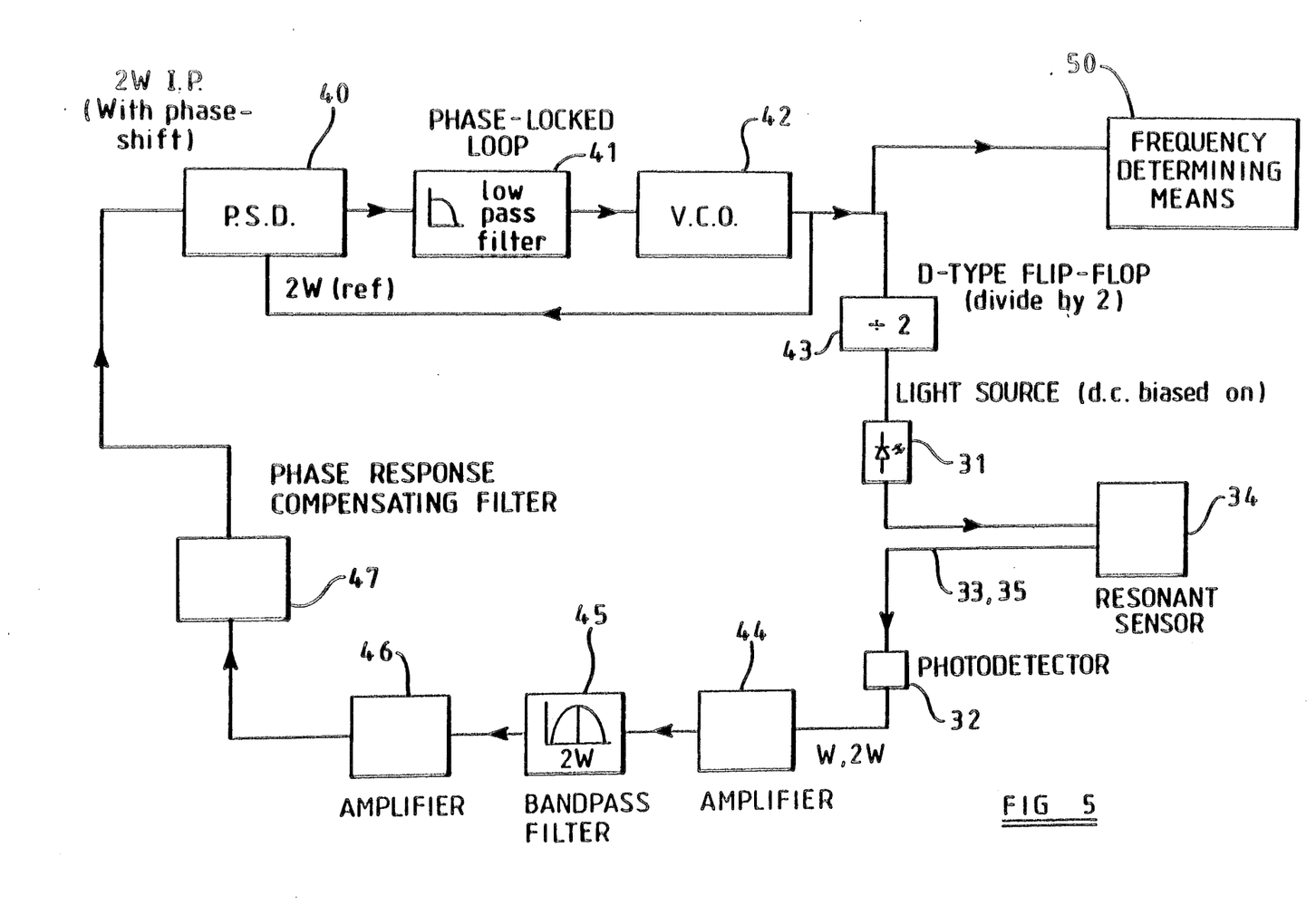
FIG. 5 is a block diagram of a third preferred embodiment of the invention.

The signal extraction apparatus shown in FIG. 5 is connected to a resonant sensor, for instance of the type 34 shown in FIG. 4, and includes an optical fibre and Y coupler 33, 35, a light source 31 such as a laser diode, and a photodetector 32 as shown in FIG. 4. The control electronics comprises a phase locked loop comprising a phase sensitive detector 40, a low pass filter 41, and a voltage controlled oscillator 42. The oscillator 42 is arranged to oscillate at a frequency 2w i.e. at twice the resonant frequency of the sensor 34. The output of the oscillator 42 is connected to a first input of the phase sensitive detector 40 and to the input of a D-type flip-flop 43, which divides the oscillator frequency by 2. The output of the flip-flop 43 drives the light source 31 so as to produce drive light whose amplitude varies at a frequency equal to the resonant frequency of the sensor 34.

Light reflected from the sensor 34 is converted into a corresponding electrical signal by the photodetector 32, and contains components at frequencies w and 2w in accordance with the equations given hereinbefore. The output signal of the photodetector 32 is amplified by an amplifier 44 and supplied to a band pass filter 45 which is arranged to pass the signal component of frequency 2w and reject components of other frequencies. The output of the filter 45 is supplied to the input of an amplifier 46, whose output is connected to a phase response compensating filter 47. The filter 47 compensates for any unwanted phase errors, for instance added by the electronics of the apparatus. The output of the filter 47 is connected to a second input of the phase sensitive detector 40.

In use, the drive light from the light source 31 excites the resonant sensor 34 into resonance. Light of the same wave length reflected from the sensor is converted by the photo detector 32 into an electrical signal and the component at frequency 2w is selected by the filter 45. Following amplification and filtering by the phase response compensating filter 47, this component is compared in phase with the output signal of the voltage controlled oscillator 42. The phase locked loop quickly locks the phase and frequency of the oscillator 42 to the phase and frequency of the reflected component of modulating frequency 2w.

When the sensor 34 is subjected to stress, for instance resulting from temperature or pressure variations, its resonant frequency changes. However, the frequency of oscillation of the oscillator 42 is caused to track or follow such changes in resonant frequency by virtue of the action of the phase locked loop. The frequency of the oscillator 42 therefore provides a measure of the stress applied to the sensor 34, and the output of the oscillator 42 is used as an output of the apparatus and is connected to frequency determining means 50, such as a frequency counter, frequency analyzer, or frequency-to-voltage converter.

In the case of the sensor with the dimensions described hereinbefore with reference to FIG. 4, the natural or unstressed resonant frequency of the bridge 36 is of the order of 500 kilohertz, and the voltage controlled oscillator 42 is arranged to have a free-running frequency of oscillation of approximately one megahertz.

An advantage of using the component of frequency 2w to detect changes in the reflected light signal compared with the subtraction technique described hereinbefore is that it is easier to extract the signal of frequency 2w. For instance, if the amplitude of the drive light signal is much larger than the amplitude of the portion of the reflected light signal carrying information about the property measured by the sensor, it can be difficult to subtract the signals in such as a way as to achieve a desired resolution. By monitoring the reflected component having a frequency of amplitude variation equal to twice the frequency of modulation of the drive signal, the desired resolution can be achieved.

Various further modifications are possible. For instance, the phase locked loop arrangement of FIG. 5 may be replaced by the drive arrangement shown in FIGS. 2 and 3 and a spectrum analyzer used to scan the output of the photodetector. No external filtering is necessary and the apparatus operates in an open loop mode.

I claim:

1. A signal extraction apparatus comprising:
    a modulating signal generator;
    light generating means for generating a drive signal comprising a carrier signal amplitude modulated by a modulating signal from said modulating signal generator;
    coupling means for coupling the drive signal to a resonant sensor having a resonant frequency substantially equal to a frequency of the modulating signal;
    a demodulator comprising a photodetector for demodulating a portion of the drive signal reflected by the sensor; and
    frequency determining means for determining changes in the resonant frequency of the sensor, said modulating signal generator comprising
        a voltage controlled oscillator having an output and a control voltage input,
        a low pass filter having an output connected to said control voltage input of said voltage controlled oscillator and an input,
        a phase sensitive detector having an output connected to said input of said low pass filter, a first input connected to said output of said voltage controlled oscillator and a second input connected to said demodulator, and
        divide-by-two frequency divider having an input connected to said output of said voltage controlled oscillator and an output connected to said generating means.

2. An apparatus as claimed in claim 1, further including a bandpass filter connected between said demodulator and said second input of said phase sensitive detector, said bandpass filter having a passband centered on a frequency substantially equal to twice said resonant frequency of said sensor.

3. An apparatus as claimed in claim 2, further including a phase response compensating filter connected between said bandpass filter and said second input of said phase sensitive detector.

4. A signal extraction method comprising the steps of:
    directing onto a resonant sensor a light drive signal comprising a carrier signal amplitude modulated by a modulating signal having a frequency substantially equal to the resonant frequency of the sensor;
    demodulating a portion of said drive signal reflected by the sensor;
    determining changes in the resonant frequency of the sensor; and
    locking the frequency of the modulating signal to the resonant frequency of the sensor by the steps of:
        generating a local signal having a frequency and a phase,
        locking the frequency and phase of the local signal to a frequency and a phase of a component of the demodulated portion of the drive signal which component has a frequency equal to twice the resonant frequency of the sensor, and
        dividing the frequency of the local signal by two thereby generating the modulating signal.

5. A signal extraction apparatus comprising:
    light generating means for generating a drive signal comprising a carrier signal amplitude modulated by a modulating signal;
    coupling means for coupling the drive signal to a resonant sensor having a resonant frequency substantially equal to a frequency of the modulating signal;
    demodulator means comprising a photodetector for demodulating a portion of the drive signal reflected by the sensor to provide an output signal; and
    frequency determining means for determining a frequency of a component of the output signal of said demodulating means which frequency is substantially equal to twice the resonant frequency of the resonant sensor.

6. An apparatus as claimed in claim 5, further including a modulating signal generator, for generating the modulating signal, said modulating signal generator comprising:
    a voltage controlled oscillator having an output and a control voltage input;
    a low pass filter having an output connected to said control voltage input of said voltage controlled oscillator and an input;
    a phase sensitive detector having an output connected to said input of said low pass filter, a first input connected to said output of said voltage controlled oscillator, and a second input connected to said demodulator; and
    a divide-by-two frequency divider having an input connected to said output of said voltage controlled oscillator and an output connected to said generating means.

7. An apparatus as claimed in claim 6, wherein said frequency determining means is connected to said output of said voltage controlled oscillator.

8. An apparatus as claimed in claim 5, further including a bandpass filter connected between said demodulator and said modulating signal generator and having a passband centered on a frequency substantially equal to twice the resonant frequency of the sensor.

9. An apparatus as claimed in claim 8, further including a phase response compensating filter connected between said bandpass filter and said modulating signal generator.

10. A signal extraction apparatus comprising:
    light generating means for generating a drive signal comprising a carrier signal amplitude modulated by a modulating signal;
    coupling means for coupling the drive signal to a resonant sensor having a resonant frequency substantially equal to a frequency of the modulating signal;
    a demodulator comprising a photo detector for demodulating a portion of the drive signal reflected by the sensor; and
    subtracting means for subtracting the modulating signal from an output signal of said demodulator.

11. An apparatus as claimed in claim 10, wherein said coupling means comprises a light guide.

12. An apparatus as claimed in claim 10, wherein said generating means includes means for amplitude modulating the carrier signal with a modulation index less than one.

13. An apparatus as claimed in claim 10, further including a further demodulator for demodulating a further portion of the drive signal and for providing the modulating signal for said subtracting means.

14. A signal extraction method comprising the steps of:

directing onto a resonant sensor a drive signal comprising a carrier signal amplitude modulated by a modulating signal having a frequency substantially equal to a resonant frequency of the sensor, said carrier signal being a light signal;

demodulating a portion of the drive signal reflected by the sensor; and subtracting the modulating signal from the demodulated reflected portion of the drive signal.

15. A method as claimed in claim 14, wherein said amplitude modulated carrier signal has an index of modulation less than one.

* * * * *